United States Patent
Mottate et al.

(10) Patent No.: US 10,889,706 B2
(45) Date of Patent: Jan. 12, 2021

(54) POLYPROPYLENE RESIN COMPOSITION

(71) Applicant: NOF CORPORATION, Tokyo (JP)

(72) Inventors: Kazuomi Mottate, Aichi (JP); Toru Tamura, Aichi (JP)

(73) Assignee: NOF CORPORATION, Tokyo (JP)

( * ) Notice: Subject to any disclaimer, the term of this patent is extended or adjusted under 35 U.S.C. 154(b) by 0 days.

(21) Appl. No.: 16/315,705

(22) PCT Filed: Jul. 24, 2017

(86) PCT No.: PCT/JP2017/026595
§ 371 (c)(1),
(2) Date: Jan. 7, 2019

(87) PCT Pub. No.: WO2018/021206
PCT Pub. Date: Feb. 1, 2018

(65) Prior Publication Data
US 2019/0300687 A1    Oct. 3, 2019

(30) Foreign Application Priority Data
Jul. 26, 2016  (JP) .................. 2016-146064

(51) Int. Cl.
| C08L 23/12 | (2006.01) |
| C08K 3/34 | (2006.01) |
| C08L 71/08 | (2006.01) |
| C08L 71/02 | (2006.01) |

(52) U.S. Cl.
CPC ............. *C08L 23/12* (2013.01); *C08K 3/34* (2013.01); *C08L 71/02* (2013.01); *C08L 71/08* (2013.01); *C08K 2201/003* (2013.01)

(58) Field of Classification Search
CPC .......... C08L 71/02; C08L 23/12; C08L 71/08; C08L 23/10; C08K 3/34; C08K 3/346; C08K 2201/003
See application file for complete search history.

(56) References Cited

U.S. PATENT DOCUMENTS

| 6,660,797 B1 | 12/2003 | Banno et al. | |
| 2009/0082513 A1 | 3/2009 | Kourogi et al. | |
| 2012/0088870 A1* | 4/2012 | Braun et al. | C08K 5/0091 524/127 |

FOREIGN PATENT DOCUMENTS

| CN | 103224664 A | 7/2013 |
| CN | 103224665 A | 7/2013 |
| CN | 105199220 A | 12/2015 |
| JP | 2001-348471 A | 12/2001 |
| JP | 2002-275333 A | 9/2002 |
| JP | 2006-083197 A | 3/2006 |
| JP | 2006-083198 A | 3/2006 |
| JP | 2008-163106 A | 7/2008 |
| JP | 2008-280361 A | 11/2008 |
| JP | 2010-43252 A | 2/2010 |
| JP | 2012-36345 A | 2/2012 |
| JP | 2012-82268 A | 4/2012 |
| JP | 2012-224870 A | 11/2012 |

OTHER PUBLICATIONS

International Search Report dated Aug. 29, 2017 issued by the International Searching Authority in counterpart International Application No. PCT/JP2017/026595 (PCT/ISA/210).
Search Report dated Mar. 11, 2020 by the European Patent Office in corresponding European Patent Application No. 17834212.7.
Communication dated Jul. 9, 2020, issued by the Korean Intellectual Property Office in Korean Application No. 10-2019-7002575.
Communication dated Nov. 2, 2020 issued by the Chinese Intellectual Property Office in related Chinese Patent Application No. 201780046607.5.

* cited by examiner

*Primary Examiner* — Nathan M Nutter
(74) *Attorney, Agent, or Firm* — Sughrue Mion, PLLC

(57) ABSTRACT

A polypropylene resin composition contains components (A), (B) and (C). A content of (A) is from 70 to 90 parts by weight, a content of (B) is from 10 to 30 parts by weight, and a content of (C) is from 1 to 5 parts by weight, when the total of the content of (A) and (B) is taken as 100 parts by weight. (A) polypropylene, (B) talc having an average particle diameter of 1 μm to 8 μm, (C) polyethylene glycol, wherein a molecular weight at the maximum point of refractive index intensity in a chromatogram obtained by gel permeation chromatography using a differential refractometer is from 2,000 to 4,000, and $S_2/S_1$ is from 1.3 to 2.0, where peak areas $S_2$ and $S_1$ are as defined herein.

2 Claims, 1 Drawing Sheet

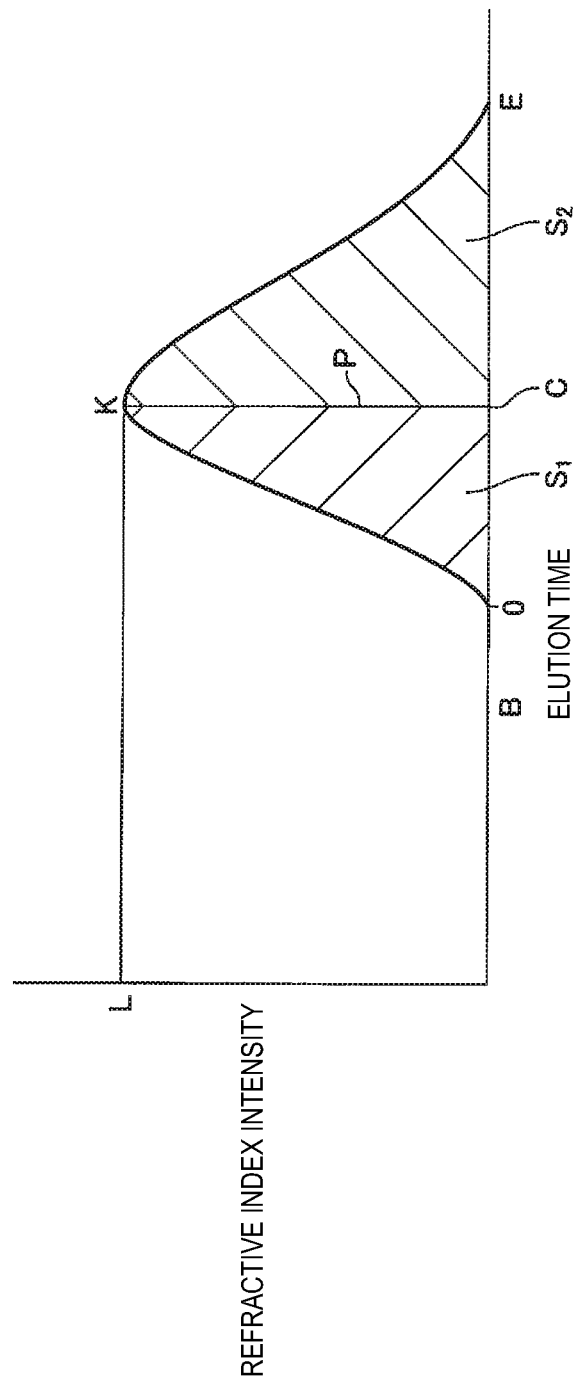

POLYPROPYLENE RESIN COMPOSITION

CROSS REFERENCE TO RELATED APPLICATIONS

This Application is a National Stage of International Application No. PCT/JP2017/026595 filed Jul. 24, 2017, claiming priority based on Japanese Patent Application No. 2016-146064 filed Jul. 26, 2016 incorporated herein by reference in its entirety.

TECHNICAL FIELD

The present invention relates to a polypropylene resin composition capable of producing a molded article excellent in scratch resistance, rigidity and impact resistance.

BACKGROUND ART

Hitherto, as materials of an interior component for automobile, for example, an instrument panel or a door trim, polyvinyl chloride has been the mainstream. But, replacement with a polypropylene composite material blended with talc proceeds because of excellence in moldability, lightweight, recyclability, economy, and the like. However, the polypropylene composite material is likely to cause material failure starting from talc and has a disadvantage of poor scratch resistance and impact resistance.

Scratch formed on the polypropylene composite material blended with talc causes light scattering because fine unevenness is formed on the surface of the scratch due to the material failure starting from talc and has a problem in that the scratch is noticeable whitish. In order to solve the problem, various techniques have been proposed. For example, in Patent Document 1 there is proposed a composition in which the scratch resistance is improved by adding an aliphatic amide to a polypropylene composite material blended with talc. However, the aliphatic amide is relatively compatible with polypropylene and hardly migrates onto the surface of molded article so that improvement effect of the scratch resistance is not sufficiently obtained.

PRIOR ART DOCUMENT

Patent Document

Patent Document 1: JP-A-2010-43252

SUMMARY OF THE INVENTION

Problem that the Invention is to Solve

An object of the present invention is to provide a polypropylene resin composition capable of producing a molded article excellent in scratch resistance, rigidity and impact resistance.

Means for Solving the Problem

A polypropylene resin composition of the present invention comprises component (A), component (B) and component (C) shown below, wherein a content of the component (A) is from 70 to 90 parts by weight, a content of the component (B) is from 10 to 30 parts by weight, and a content of the component (C) is from 1 to 5 parts by weight, when a total of the content of the component (A) and the content of the component (B) is taken as 100 parts by weight:

(A) polypropylene, (B) talc having an average particle diameter of 1 μm to 8 μm, (C) polyethylene glycol, wherein a molecular weight at a maximum point of refractive index intensity in a chromatogram obtained by gel permeation chromatography using a differential refractometer is from 2,000 to 4,000, and $S_2/S_1$ is from 1.3 to 2.0, when a peak area from an elution start point to an elution time corresponding to the maximum point of refractive index intensity is taken as $S_1$ and a peak area from the elution time corresponding to the maximum point of refractive index intensity to an elution end point is taken as $S_2$.

Effect of the Invention

According to the invention, a polypropylene resin composition capable of producing a molded article excellent in scratch resistance, rigidity and impact resistance can be provided by blending a specific polyethylene glycol into polypropylene blended with talc, thereby enhancing lubricity of the surface of molded article and interfacial strength between polypropylene and talc.

BRIEF DESCRIPTION OF THE DRAWING

The FIGURE is a drawing of a model chromatogram for illustrating peak areas $S_1$ and $S_2$ as defined in the invention.

MODE FOR CARRYING OUT THE INVENTION

Hereinafter, the invention will be described in detail.

<(A) Polypropylene>

Polypropylene (A) used in the invention includes homopolypropylene obtained by sole polymerization of propylene, a random polypropylene obtained by copolymerization of propylene and ethylene, and a block polypropylene obtained by sole polymerization of propylene to form homopolypropylene and subsequent copolymerization of propylene and ethylene in the presence of the homopolypropylene. Among these, a block polypropylene is particularly preferred from the standpoint of impact resistance and rigidity.

Block polypropylene includes, for example, J708UG, J830HV and J715M all manufactured by Prime Polymer Co., Ltd., PMA60Z and PMB60A all manufactured by SunAllomer Ltd., and BC02N and BC03GS all manufactured by Japan Polypropylene Corp.

<(B) Talc>

The talc used in the invention has an average particle diameter measured by a laser diffraction method in the range from 1 μm to 8 μm. When the average particle diameter is larger than 8 μm, the scratch resistance deteriorates. When the average particle diameter is smaller than 1 μm, a cohesive force between talc particles is large to cause dispersion failure in polypropylene so that the scratch resistance and rigidity deteriorate.

<(C) Polyethylene Glycol>

The polyethylene glycol used in the invention has a molecular weight at the maximum point of refractive index intensity in a chromatogram obtained by gel permeation chromatography using a differential refractometer of from 2,000 to 4,000, and $S_2/S_1$ of from 1.3 to 2.0, when a peak area from an elution start point to an elution time corresponding to the maximum point of refractive index intensity is taken as $S_1$ and a peak area from the elution time corresponding to the maximum point of refractive index intensity to an elution end point is taken as $S_2$. When the molecular weight described above of polyethylene glycol is less than 2,000, the scratch resistance deteriorates even when the peak area ratio $S_2/S_1$ described above is from 1.3 to 2.0. Further, when the molecular weight described above is more than 4,000, the rigidity tends to deteriorate, even when the peak area ratio $S_2/S_1$ described above is from 1.3 to 2.0. From these standpoints, the molecular weight of polyethylene glycol is more preferably 2,500 or more and is more preferably 3,500 or less.

When the peak area ratio $S_2/S_1$ described above is more than 2.0, the scratch resistance deteriorates even when the molecular weight described above of polyethylene glycol is from 2,000 to 4,000. From this standpoint, the $S_2/S_1$ is more preferably 1.8 or less, and particularly preferably 1.6 or less. Further, when the peak area ratio $S_2/S_1$ described above is less than 1.3, the production thereof is difficult and the rigidity and impact resistance deteriorate.

This requirement is further described hereinafter.

The peak area ratio ($S_2/S_1$) is defined by a chromatogram obtained with gel permeation chromatography (GPC) using a differential refractometer. The chromatogram is a graph showing a relation between a refractive index intensity and an elution time.

Herein, the FIGURE is a model drawing of a chromatogram obtained by gel permeation chromatography of polyethylene glycol and the horizontal axis indicates an elution time and the vertical axis indicates a refractive index intensity obtained by using a differential refractometer.

When a sample solution is injected into a gel permeation chromatograph to develop, elution starts from a molecule having a highest molecular weight and an elution curve rises with increase in the refractive index intensity. Then, after passing through the maximum point K of refractive index intensity, the elution curve declines.

Polyethylene glycol ordinarily has one maximum point of refractive index intensity of chromatogram in gel permeation chromatography and shows a unimodal peak. In this case, peaks arising from a developing solvent and the like used in the gel permeation chromatograph and pseudo peaks due to fluctuations of the baseline arising from a column and an apparatus used are excluded.

Here, a peak area from an elution start point O to an elution time C corresponding to the maximum point of refractive index intensity K is taken as $S_1$. Besides, the elution time C indicates an intersection point of a perpendicular line P drawn from the maximum point K of refractive index intensity to the baseline B. Further, a peak area from the elution time C to an elution end point E is taken as $S_2$. The peak area $S_1$ corresponds to an amount of a component of a relatively high molecular weight side, and the peak area $S_2$ corresponds to an amount of a component of a relatively low molecular weight side. The condition that $S_2/S_1$ is from 1.3 to 2.0 means that the component of a low molecular weight side is much than the component of a high molecular weight side to some extent, and this molecular weight balance contributes to the scratch resistance, rigidity and impact resistance of the polypropylene resin composition.

In the invention, the gel permeation chromatography (GPC) for obtaining the peak area ratio ($S_2/S_1$) described above is performed by using TOSOH HLC-8320GPC as a GPC system and two TOSOH TSKgel Super Multipore HZ-M columns and one TOSOH TSKgel Super H-RC column connected in series as a column. A column temperature is set to 40° C., polystyrene is used as a standard substance, and tetrahydrofuran is used as a developing solvent. The developing solvent is poured at a flow rate of 1 ml/min, 0.1 ml of a sample solution having a sample concentration of 0.1% by weight is injected, and a chromatogram indicated by the refractive index intensity and the elution time is obtained using the EcoSEC-Work Station GPC calculation program.

(Ratio of Each Component)

In the invention, a content of the component (A) is from 70 to 90 parts by weight and a content of the component (B) is from 10 to 30 parts by weight, when the total of the content of the component (A) and the content of the component (B) is taken as 100 parts by weight. When the content of the component (B) (talc) exceeds 30 parts by weight, the scratch resistance and impact resistance of the resin composition deteriorate. Further, when the content of the component (B) is less than 10 parts by weight, the rigidity and impact resistance of the resin composition deteriorate.

A content of polyethylene glycol (C) is from 1 to 5 parts by weight, when the total of the content of polypropylene (A) and the content of talc (B) is taken as 100 parts by weight. Because of this, the scratch resistance, rigidity and impact resistance of the polypropylene resin composition are improved. From this standpoint, the content of polyethylene glycol (C) is more preferably 2 parts by weight or more and is more preferably 4 parts by weight or less.

<Other Additives>

To the polypropylene resin composition according to the invention, other additives, for example, rubber, a plasticizer, a softening agent, an antioxidant, a processing aid, a flame retardant, an ultraviolet absorber or a coloring agent may be added in a range in which the effect is not impaired.

The polypropylene resin composition according to the invention can be produced by melting and kneading (A) polypropylene, (B) talc and (C) polyethylene glycol. The kneading temperature is suitably from 180 to 260° C., and preferably from 200 to 240° C.

In the kneading of (A) polypropylene, (B) talc and (C) polyethylene glycol, a continuous type extruder, for example, a single screw extruder, a twin screw extruder, a biaxial rotor-type extruder can be used. The polypropylene resin composition obtained can be molded in a prescribed form by a known molding method, for example, an extrusion molding method, an injection molding method, a blow molding method or a compression molding method.

The polypropylene resin composition according to the invention is excellent in the scratch resistance, rigidity and impact resistance. Because of this, the polypropylene resin composition can be used as materials of an interior component for automobile, for example, an instrument panel or a door trim.

EXAMPLE

The invention will be described more specifically with reference to the examples.

<Polypropylene Resin Composition>

Each component was dry-blended in the composition shown in Table 1 and Table 2 and kneaded and granulated by a twin screw extruder at a preset temperature of 230° C. to obtain a polypropylene resin composition. The polypropylene resin composition obtained was injection-molded by an injection molding machine at a cylinder temperature of 230° C. and a mold temperature of 30° C., and the scratch resistance, rigidity and impact resistance were evaluated.

In Tables 1 and 2, the molecular weight of polyethylene glycol (C) is a weight average molecular weight at the maximum point of refractive index intensity in a chromatogram obtained by gel permeation chromatography using a differential refractometer.

Evaluation methods of the respective performances are as follows.

<Scratch Resistance>

Scratches of a grid pattern formed by 20 vertical and horizontal lines at intervals of 2 mm were formed on a test piece (80 mm×55 mm×t2 mm) by Scratch Tester 430P manufactured by ERICHSEN under the conditions of a load of 5N, a pin shape of 1 mmϕ and a scratch speed of 1,000 mm/min. Before and after the scratching of the test piece, lightness L was measured by SQ-2000 manufactured by Nippon Denshoku Industries Co., Ltd. under the conditions of a C illuminant, a visual field of 10° and a measurement surface of ϕ30 mm and a difference (ΔL) thereof was calculated. The L is a value of L*a*b* color space defined in JIS Z 8781-4.

<Rigidity>

Flexural modulus was measured at 23° C. and a flexural speed of 2 mm/min in accordance with JIS K 7203.

<Impact Resistance>

Izod impact strength of a notched test piece was measured at 23° C. in accordance with JIS K 7110.

TABLE 1

| | (A) Polypropylene | (B) Talc | | (C) Polyethylene Glycol | | | Scratch Resistance | Rigidity Flexural | Impact Resistance |
|---|---|---|---|---|---|---|---|---|---|
| | | Average Particle | | | | | | | |
| | Parts by Weight | Diameter (mm) | Parts by Weight | Molecular Weight | $S_2/S_1$ | Parts by Weight | ΔL | Modulus (MPa) | Izod (kJ/m²) |
| Example 1 | 80 | 3 | 20 | 3,500 | 1.3 | 3 | 0.5 | 2100 | 11 |
| Example 2 | 70 | 3 | 30 | 3,500 | 1.3 | 3 | 0.7 | 2200 | 10 |
| Example 3 | 90 | 3 | 10 | 3,500 | 1.3 | 3 | 0.4 | 2000 | 10 |
| Example 4 | 80 | 1 | 20 | 3,500 | 1.3 | 3 | 0.8 | 2100 | 13 |
| Example 5 | 80 | 8 | 20 | 3,500 | 1.3 | 3 | 0.7 | 2100 | 10 |
| Example 6 | 80 | 3 | 20 | 2,500 | 1.3 | 3 | 0.6 | 2100 | 11 |
| Example 7 | 80 | 3 | 20 | 3,400 | 1.6 | 3 | 1.0 | 2000 | 12 |
| Example 8 | 80 | 3 | 20 | 3,400 | 1.8 | 3 | 1.2 | 2000 | 13 |
| Example 9 | 80 | 3 | 20 | 3,500 | 1.3 | 1 | 1.5 | 2300 | 11 |
| Example 10 | 80 | 3 | 20 | 3,500 | 1.3 | 5 | 0.9 | 2000 | 11 |

TABLE 2

| | (A) Polypropylene | (B) Talc | | (C) Polyethylene Glycol | | | Scratch Resistance | Rigidity Flexural | Impact Resistance |
|---|---|---|---|---|---|---|---|---|---|
| | | Average Particle | | | | | | | |
| | Parts by Weight | Diameter (mm) | Parts by Weight | Molecular Weight | $S_2/S_1$ | Parts by Weight | ΔL | Modulus (MPa) | Izod (kJ/m²) |
| Comparative Example 1 | 60 | 3 | 40 | 3,500 | 1.3 | 3 | 3.5 | 2300 | 5 |
| Comparative Example 2 | 100 | — | 0 | 3,500 | 1.3 | 3 | 0.3 | 1700 | 6 |
| Comparative Example 3 | 80 | 0.5 | 20 | 3,500 | 1.3 | 3 | 2.9 | 1600 | 5 |
| Comparative Example 4 | 80 | 15 | 20 | 3,500 | 1.3 | 3 | 4.0 | 2000 | 10 |
| Comparative Example 5 | 80 | 3 | 20 | 1,200 | 1.3 | 3 | 2.6 | 2100 | 10 |
| Comparative Example 6 | 80 | 3 | 20 | 12,000 | 1.8 | 3 | 1.3 | 1900 | 9 |
| Comparative Example 7 | 80 | 3 | 20 | 3,400 | 2.1 | 3 | 1.7 | 2200 | 11 |
| Comparative Example 8 | 80 | 3 | 20 | 3,500 | 1.3 | 0.5 | 2.4 | 2100 | 7 |
| Comparative Example 9 | 80 | 3 | 20 | 3,500 | 1.3 | 10 | 1.6 | 1800 | 4 |

As is apparent from the results shown in Table 1, Examples 1 to 10 were all excellent in the scratch resistance, rigidity and impact resistance.

On the other hand, Comparative Examples 1 to 9 were insufficient in balance of these performances.

Specifically, Comparative Example 1 was inferior in the scratch resistance and impact resistance due to the excess of talc. Comparative Example 2 was inferior in the rigidity and impact resistance due to a too small amount of talc. Comparative Example 3 was inferior in all performances due to a too small average particle diameter of talc. Comparative Example 4 was inferior in the scratch resistance due to a too large average particle diameter of talc.

Comparative Example 5 was inferior in the scratch resistance due to a too low molecular weight of polyethylene glycol. Comparative Example 6 was inferior in the rigidity due to a too high molecular weight of polyethylene glycol.

Comparative Example 7 was inferior in the scratch resistance due to a too large peak area ratio $S_2/S_1$ in gel permeation chromatography of polyethylene glycol. Comparative Example 8 was inferior in the scratch resistance and impact resistance due to a too small blending amount of polyethylene glycol. Comparative Example 9 was inferior in all performances due to a too large blending amount of polyethylene glycol.

Hereinafter, preferable blending examples of the polypropylene resin composition according to the invention are described. In Blending Examples 1 to 3, as polypropylene, J708UG manufactured by Prime Polymer Co., Ltd. was used, as talc, talc having an average particle diameter of 3 μm was used, and as polyethylene glycol, polyethylene glycol having a molecular weight of 3,500 and $S_2/S_1$ of 1.3 was used.

Blending Example 1

| | |
|---|---|
| Polypropylene | 80 parts by weight |
| Talc | 20 parts by weight |
| Polyethylene glycol | 3 parts by weight |
| Ethylene propylene rubber | 10 parts by weight |
| Pentaerythritol tetrakis[3-(3,5-di-tert-butyl-4-hydroxyphenyl)propionate] | 0.1 part by weight |
| Tris(2,4-di-tert-butylphenyl)phosphite | 0.1 part by weight |

Blending Example 2

| | |
|---|---|
| Polypropylene | 70 parts by weight |
| Talc | 30 parts by weight |
| Polyethylene glycol | 3 parts by weight |

-continued

| | |
|---|---|
| 2-(5-Chloro-2H-benzotriazol-2-yl)-6-tert-butyl-4-methylphenol | 0.1 part by weight |
| Tetrakis(2,2,6,6-tetramethyl-4-piperidyl)butane-1,2,3,4-tetracarboxylate | 0.1 part by weight |

Blending Example 3

| | |
|---|---|
| Polypropylene | 80 parts by weight |
| Talc | 20 parts by weight |
| Polyethylene glycol | 3 parts by weight |
| Carbon black | 1 part by weight |
| 2,6-di-tert-butyl-p-cresol | 0.1 part by weight |
| Calcium stearate | 0.1 part by weight |
| Bis(2,2,6,6-tetramethyl-4-piperidyl)sebacate | 0.2 parts by weight |

The polypropylene resin composition obtained in Blending Examples 1 to 3 were all excellent in the scratch resistance, rigidity and impact resistance.

While the invention has been described in detail and with reference to specific embodiments thereof, it will be apparent to those skilled in the art that various changes and modifications can be made therein without departing from the spirit and scope of the invention.

The invention claimed is:

1. A polypropylene resin composition comprising component (A), component (B) and component (C) shown below, wherein a content of the component (A) is from 70 to 90 parts by weight, a content of the component (B) is from 10 to 30 parts by weight, and a content of the component (C) is from 2 to 5 parts by weight, when a total of the content of the component (A) and the content of the component (B) is taken as 100 parts by weight:
   (A) polypropylene,
   (B) talc having an average particle diameter of 1 μm to 8 μm,
   (C) polyethylene glycol, wherein a molecular weight at a maximum point of refractive index intensity in a chromatogram obtained by gel permeation chromatography using a differential refractometer is from 2,000 to 3,500, and $S_2/S_1$ is from 1.3 to 1.6, when a peak area from an elution start point to an elution time corresponding to the maximum point of refractive index intensity is taken as $S_1$ and a peak area from the elution time corresponding to the maximum point of refractive index intensity to an elution end point is taken as $S_2$.

2. The polypropylene resin composition as claimed in claim 1, wherein a content of the component (C) is from 3 to 5 parts by weight.

* * * * *